United States Patent [19]

Sakurai

[11] Patent Number: 5,130,853
[45] Date of Patent: Jul. 14, 1992

[54] ADJUSTABLE MAGNIFYING DEVICE FOR HAND-HELD VIDEO DISPLAY APPARATUS AND THE LIKE

[75] Inventor: Jun Sakurai, Ashiva, Japan

[73] Assignee: Konami Industry Co., Ltd., Japan

[21] Appl. No.: 574,369

[22] Filed: Aug. 28, 1990

Related U.S. Application Data

[63] Continuation-in-part of Ser. No. 435,700, Nov. 13, 1989, Pat. No. 4,991,935.

[51] Int. Cl.⁵ .............................................. G02B 27/02
[52] U.S. Cl. ..................................... 359/803; 359/804; 359/808
[58] Field of Search ............................... 350/235–251; 248/917–924, 580, 581, 591–602, 682–693; 273/148 A, 148 B, 148 R; 40/362–371, 473–496; 359/798–810, 896, 900, 440–442, 503–506; 353/100–101, DIG. 5; 379/450

[56] References Cited

U.S. PATENT DOCUMENTS

| 1,892,745 | 1/1933 | Bolich | 350/241 |
|---|---|---|---|
| 3,389,636 | 6/1988 | Weltzner et al. | 359/480 |
| 3,389,636 | 6/1968 | Harvey | 359/802 |
| 3,748,765 | 7/1973 | Bass et al. | 40/367 |
| 3,804,504 | 4/1974 | Scott | 353/77 |
| 4,030,814 | 6/1977 | Clifton et al. | 359/801 |
| 4,051,535 | 9/1977 | Inglis | 359/742 |
| 4,076,391 | 2/1978 | Teiser et al. | 359/806 |
| 4,099,851 | 7/1978 | Rethore | 359/647 |
| 4,250,644 | 2/1981 | Jantzen | 40/367 |
| 4,372,068 | 2/1983 | Knapp et al. | 359/506 |
| 4,443,819 | 4/1984 | Funada et al. | 358/236 |
| 4,454,669 | 6/1984 | Simmons | 40/361 |
| 4,549,785 | 10/1985 | Vitrac | 359/474 |
| 4,577,928 | 3/1986 | Brown | 359/497 |
| 4,712,870 | 12/1987 | Robinson et al. | 359/738 |
| 4,759,621 | 7/1988 | Hawkins | 248/474 |
| 4,764,958 | 8/1988 | Grant | 379/450 |
| 4,958,907 | 9/1990 | Davis | 359/805 |
| 4,991,935 | 2/1991 | Sakurai | 350/239 |

FOREIGN PATENT DOCUMENTS

| 1075928 | 10/1954 | France | 350/239 |
|---|---|---|---|
| 1220802 | 1/1971 | United Kingdom | 350/239 |

Primary Examiner—Rodney B. Bovernick
Assistant Examiner—Thong Nguyen
Attorney, Agent, or Firm—Welsh & Katz, Ltd.

[57] ABSTRACT

A magnifying device for use with a hand-held video display apparatus or the like having a generally rectangular housing and a video display visually observable from externally of the housing. The magnifying device includes a frame adapted for releasable mounting on the video display housing, and has a magnifying lens adapted to overlie the video display and effect magnification of the video display during operation when the magnifying device is mounted on the video display apparatus.

11 Claims, 2 Drawing Sheets

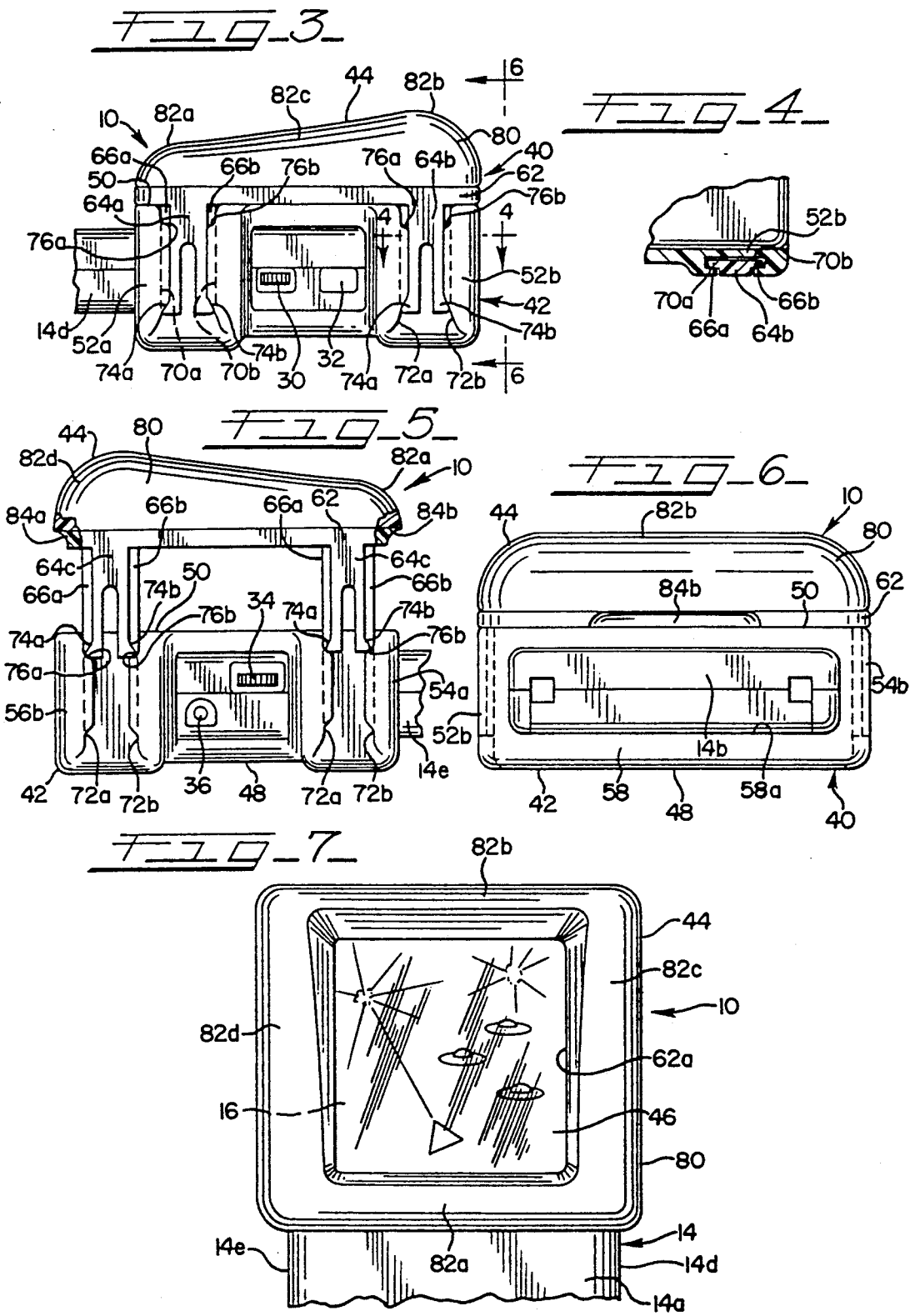

ADJUSTABLE MAGNIFYING DEVICE FOR HAND-HELD VIDEO DISPLAY APPARATUS AND THE LIKE

BACKGROUND OF THE INVENTION

This is a continuation-in-part from application Ser. No. 07/435,700, filed Nov. 13, 1989, now U.S. Pat. No. 4,991,935 which is assigned to the assignee of the present application and is incorporated herein by reference. The present invention relates generally to magnifying devices, and more particularly to a novel adjustable magnifying device which may be mounted on a hand-held apparatus to magnify an alpha-numeric or video display or the like of the apparatus.

The advent of apparatus having alpha-numeric and/or video displays, such as calculators and video games, has led to the development of compact hand-held model which generally include a rectangular housing adapted to be held in a hand of the user. The housing conventionally supports an alpha-numeric or video display exposed through an upper surface of the housing. Control levers, buttons and/or knobs are generally supported by the housing at convenient locations so as to enable an operator to readily manipulate the various controls with one hand while holding the housing in the other hand. A drawback to many hand-held video and alpha-numeric display apparatus of known design is that the display, which may comprise an LCD screen, presents the displayed characters or scenes in relatively small scale so as to make it difficult for some persons to readily decipher the displayed characters or images. In such cases, a device adapted for cooperation with the hand-held calculator or video display apparatus and operative to enhance recognition of the display by magnification would greatly improve the usability of such display apparatus by persons who otherwise would have difficulty recognizing the displayed characters or images.

SUMMARY OF THE INVENTION

One of the primary objects of the present invention is to provide a novel magnifying device particularly adapted for use with apparatus having an alpha-numeric or video display so as to magnify the display.

A more particular object of the present invention is to provide a novel magnifying device for use with a hand-held apparatus having an alpha-numeric or video display and which may be readily releasably mounted on the video display apparatus housing such that a magnifying lens carried by the magnifying device overlies the alpha-numeric or video display.

A feature of the magnifying device in accordance with the present invention lies in supporting the magnifying lens in a manner to enable adjustment of the magnifying lens relative to the alpha-numeric or video display to facilitate focusing when the magnifying device is mounted on the display apparatus.

Another feature of the magnifying device in accordance with the present invention lies in the provision of a base member mountable on the display apparatus housing and having openings which enable manipulation of various controls on the display apparatus when the magnifying device is mounted thereon, the base member supporting a magnifying lens support frame which is adjustable relative to the base member while maintaining the magnifying lens generally parallel to the display.

Further objects, features and advantages of the invention will become apparent from the following detailed description when taken in conjunction with the accompanying drawings wherein like reference numerals designate like elements throughout the several views.

BRIEF DESCRIPTION OF THE DRAWINGS

FIG. 3 is a fragmentary side elevational view of the magnifying device and display apparatus of FIG. 1;

FIG. 4 is a fragmentary sectional view taken substantially along line 4—4 of FIG. 3;

FIG. 5 is a fragmentary side elevational view similar to FIG. 3 but viewed from the opposite side and illustrating the magnifying lens in a raised position relative to the display apparatus;

FIG. 6 is a rear elevational view taken substantially along line 6—6 of FIG. 3; and FIG. 7 is a fragmentary plan view of the video display apparatus and magnifying device of FIG. 1.

DETAILED DESCRIPTION

Figure 1:
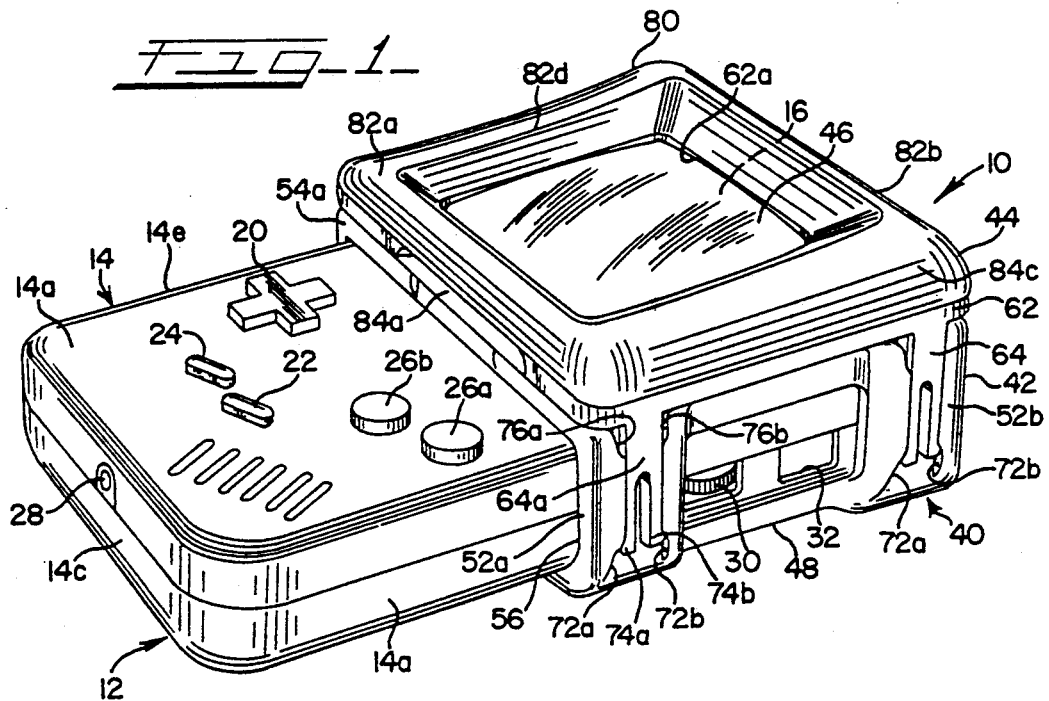
FIG. 1 is a perspective view illustrating a magnifying device in accordance with the present invention mounted on a hand-held apparatus having an alpha-numeric or video display.
Figure 2:
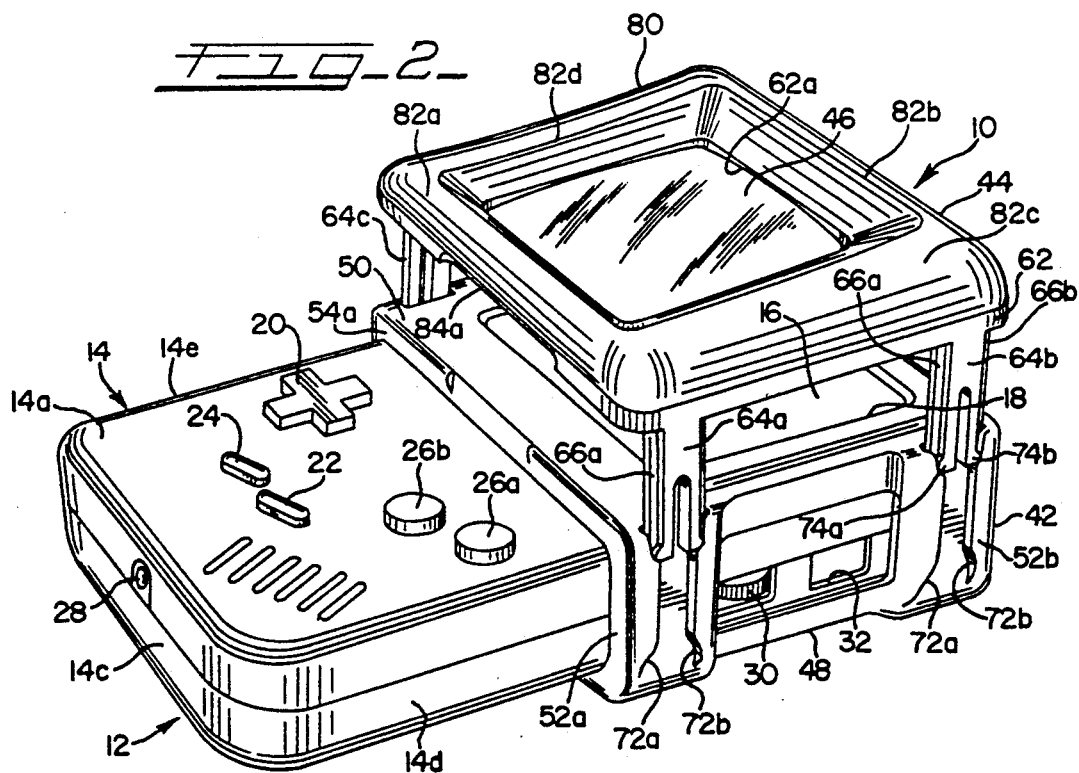
FIG. 2 is a perspective view similar to FIG. 1 but showing the magnifying lens in a raised position relative to the alpha-numeric or video display.

Referring now to the drawings, a magnifying device constructed in accordance with one embodiment of the present invention is indicated generally at 10. The magnifying device 10 is adapted for cooperative relation with a hand-held display apparatus, indicated generally at 12, such as an electronic calculator or video game or the like so as to magnify characters or images created on an alpha-numeric or video display during operation of the calculator or video apparatus.

The hand-held display apparatus 12 is of conventional design and includes a generally rectangular housing 14 of a size enabling it to be held in the operator's hand while manipulating various controls, as on a hand-held calculator or video game apparatus. The rectangular housing 14 has a longitudinal axis extending along the major dimension of the housing, and a minor axis transverse to the longitudinal axis. In the illustrated embodiment, the display apparatus 12 represents a hand-holdable video game apparatus having a generally rectangular video display 16, such as a conventional LCD screen, visible through a rectangular opening 18 formed in an upper surface 14a of housing 14. A control 20 of generally cross or X-shape is supported by the housing 14 so as to extend above the upper surface 14a and has arms extending generally in the direction of the X (longitudinal) and Y (transverse) coordinates in the plane of the upper surface 14a. The control 20 enables operator controlled movement or "action" of a character or image on the video display along right-angle X and Y coordinates within the video display, as viewed generally normal to the video display as in FIG. 7.

A "start" mode control knob or button 22 and a "select" mode knob or button 24 extend above the housing surface 14a to enable starting of a game mode and response to instructions displayed on the video display 16 under the control of a game format programmed on a ROM loaded within an end 14b of the video display apparatus housing, as shown in FIG. 6. Other control knobs or buttons, such as indicated at 26a and 26b, may extend upwardly from the housing surface 14a for controlling other operating characteristics of the video display apparatus. Additional operating controls and accessory connector sites are provided along the laterally opposite sides 14d and 14e and on the ends 14b and 14c of the housing 14, such as an earphone jack 28 in end surface 14c and a volume control 30 and external connector site 32 in side 14d, as illustrated in FIG. 1.

A video display contrast control 34 and an auxiliary power supply port 36 may be provided in the side 14e of housing 14, as illustrated in FIG. 5. A power 31 control on/off switch may be provided on either side wall of the housing 14 or on the rear end 14b. Video display game apparatus of the type thus far described are commercially available and are illustrative of only one type of video display apparatus with which the present invention finds application. As aforementioned, the display apparatus 12 may also comprise an electronic calculator having a rectangular housing and a plurality of numerical input and function control buttons or the like accessible through an upper surface of the apparatus housing.

The magnifying device 10 includes frame means, indicated generally at 40, adapted for releasable mounting on the video display apparatus housing 14. The frame means 40, which may alternatively be termed housing means, includes a base member or frame 42 adapted to be releasably mounted on the display apparatus housing 14, and a magnifying lens support frame 44 which is mounted on the base frame 42 and is adjustable relative to the base frame. The lens support frame 44 supports a rectangular magnifying lens 46 adapted to overlie the video display 16 when the magnifying device is mounted on housing 14. As will be more fully described, the magnifying lens 46 is operative to magnify the characters and images produced on the video display 16 when viewed through the magnifying lens during operation of the video display apparatus, and is adjustable relative to the display to facilitate focusing of the magnified images produced on the video display.

Both the base member or frame 42 and lens support frame 44 are generally rectangular in plan configuration and may be formed of a relatively rigid lightweight material such as plastic or other suitable material. The base frame 42 has a lower wall 48 and an upper wall 50 fixed in parallel relation by pairs of side struts or columns 52a,b and 54a,b which are preferably formed integral with the lower and upper walls and interconnect 30 the four corners of the lower and upper walls. As will be 31 described, the side columns 52a,b and 54a,b are formed as guide tracks for cooperative relation with the lens support frame 44.

The base frame 42 has a rectangular opening 56 in its forward end which is sized to receive the video apparatus housing 14 therein in telescoping relation. The lower wall 48 may have one or more openings to expose, for example, a battery access cover in the bottom surface of the video apparatus housing 14. The side columns 52a,b and 54a,b are spaced apart to provide open areas which expose the various operating controls and connector sites in the laterally opposite sides 14d and 14e of the housing 14. A rear end 58 of the base frame 42 is configured to engage the end 14b of the video display apparatus housing 14 when the base frame 42 is mounted in predetermined telescoping relation on the housing 14. A suitable opening 58a in the rear end 58 of the base frame provides access through which modular ROMs may be inserted into and removed from a ROM receiving chamber formed in the end 14b of the video display housing 14 without removing the magnifying device.

The magnifying lens support frame 44 has a substantially planar base plate 62 having a rectangular opening 62a formed centrally therethrough. Four depending arms 64a-d of substantially identical configuration are formed integral with the base plate at its corners so as to establish pairs of support arms on laterally opposite sides of the base plate. Each of the support arms 64a-d extends in normal relation to the base plate 62 and is bifurcated from its lower free end along approximately one-half the length of the arm so that the lower bifurcated extremities of each arm 64a-d may be flexed inwardly toward each other. Each of the support arms 64a-d has a pair of laterally outwardly extending ribs formed along the full length of the corresponding support arm such as indicated at 66a and 66b in FIG. 4. The ribs 66a and 66b on each support arm 64a-d are received within complimentary channels or grooves 70a and 70b formed longitudinally in the corresponding pairs of columns 52a,b and 54a,b so as to enable relative sliding movement of the ribs within the corresponding channels or grooves which serve as guide channel or track means for the support arms.

The lens support frame 44 is assembled onto the lower base frame 42 by inserting the support arms 64a-d downwardly within the corresponding columns 52a,b and 54a,b on the base frame so that the ribs 66a and 66b on each support arm are slidably received within the corresponding channels or grooves 70a and 70b. The lower end of each column 52a,b and 51a,b adjacent the corresponding guide grooves 70a and 70b is formed with concave contoured edge surfaces, indicated at 72a and 72b, which define detent locating recesses. Each of the support arms 64a-d on the lens support frame has a pair of outwardly extending convexly curved detents 74a and 74b formed thereon which corporate with the respective recesses 72a and 72b when the base plate 62 is assembled against the upper wall 50 of the base frame 42 so as to releasably retain magnifying the lens support frame in its lowered position relative to the base frame.

The upper ends of the guide tracks 66a,b are also formed with concave profiles or recesses 76a and 76b, respectively, which cooperate with the detents 74a and 74b on the support arms of the lens support frame 44 when it is raised a predetermined distance relative to the base frame 42. The detents 74a,b engage the recess surfaces 76a and 76b to maintain the lens support frame in its uppermost raised position. The bifurcated support arms 64a-d are sized such that the support arms frictionally engage the corresponding guide tracks 66a,b sufficiently to maintain the lens support frame 44 in any selected position relative to the base frame between its lowered and raised positions, thus enabling variable adjustment to selectively focus the images on the display 16 magnified by the lens 46.

As aforementioned, the lens support frame 44 supports a magnifying lens 46. The magnifying lens 46 is generally rectangular in plan configuration and is retained about its periphery between the base plate 62 and a rectangular lens retaining frame 80 secured to the base plate 62. In the illustrated embodiment, the retaining frame 80 has a forward transverse end 82a, a rearward transverse end 82b and laterally opposite longitudinally extending sides 82c and 82d. The upper surfaces of the transverse ends 82a,b and sides 82c,d of the lens retaining frame 80 are convexly contoured upwardly such that the rearward transverse end 82b is of higher elevation than the forward transverse end 82a when the magnifying device is viewed in side elevation as in FIGS. 3 and 5. The sides 82c and 82d of the lens retaining frame have upper contoured surfaces which blend with the transverse end surfaces 82a and 82b to provide a contemporary contoured appearance. By making the rearward transverse end surface 82b of the lens retaining frame 80 of greater height or elevation than the forward transverse end 82a, glare or other reflections off the upper surface of the magnifying lens from external light sources are substantially diminished.

In operation, the magnifying device 10 is mounted on a hand-held apparatus having an alpha-numeric or video display or the like by sliding the base frame 42 over the rear end of the display apparatus housing so that the magnifying lens 46 overlies the video or alpha-numeric display 16. Access to the various functional control and accessory attachment sites on the video display housing 14 is provided by the openings in the base frame 42. With the magnifying device 10 mounted on a video or alpha-numeric display apparatus, an operator may readily hold the video display apparatus and associated magnifying device in one hand while manipulating the various controls on the display apparatus with the operator's free hand. The display 16 may be readily observed through the magnifying lens 46 which may be adjusted relative to the display 16 by grasping the lens support frame 80 and raising or lowering the magnifying lens to focus the magnified images on the display. In this manner, the ability to decipher the characters or images displayed on the display screen is significantly enhanced. To facilitate raising of the lens support frame 44 and associated magnifying lens 46 relative to the base frame 42, the transverse front and rear ends 80a and 80b, and/or the sides 80c and 80d, of the lens retaining frame and the base plate 62 may be recessed to provide finger holds, such as indicated at 84a and 84b in FIG. 5.

While a preferred embodiment of the adjustable magnifying device in accordance with the present invention has been illustrated and described, it will be understood to those skilled in the art that changes and modifications may be made therein without departing from the invention and its broader aspects. Various features of the invention are defined in the following claims.

What is claimed is:

1. A magnifying device for use with a hand-held video or alpha-numeric display apparatus which includes a housing having laterally opposite side surfaces, and a display supported by the housing so as to be visually observable from externally of the housing, said magnifying device comprising frame means including a base member adapted for releasable engagement with said opposite side surfaces of the housing to enable mounting on the housing, and a magnifying lens support frame having a plurality of laterally spaced support arms, said base member having a corresponding number of guide tracks adapted to receive said support arms in adjustable sliding relation adjacent said opposite said surfaces of the housing, said support frame supporting a magnifying lens adapted to overlie the display when said magnifying device is mounted on the housing, said magnifying lens being operative to effect magnification of said display when viewed through said lens during operation of the display apparatus.

2. A magnifying device as defined in claim 1 wherein said magnifying lens is supported by said lens support frame so as to lie in a plane substantially parallel to the display when the magnifying device is mounted on the display apparatus.

3. A magnifying device as defined in claim 1 wherein said lens support frame defines an opening adapted to overlie the display when said magnifying device is mounted on the housing, said lens being supported within opening.

4. A magnifying device as defined in claim 3 wherein said lens support frame has an upwardly facing generally convex surface peripherally of said lens.

5. A magnifying device for use with a hand-held video or alpha-numeric display apparatus which includes a housing having a generally rectangular transverse cross-sectional configuration, and a display supported by the housing so as to be visually observable from externally of the housing, said magnifying device comprising frame means including a base member adapted for releasable mounting on said housing in sliding relation therewith, and a magnifying lens support frame having a plurality of support arms, said base member having a corresponding number of guide tracks adapted to receive said support arms in adjustable sliding relation, said support frame supporting a magnifying lens adapted to overlie the display when said magnifying device is mounted on the housing, said magnifying lens being operative to effect magnification of said display when view through said lens during operation of the display apparatus.

6. A magnifying device as defined in claim 5 wherein said base member defines a recess adapted to receive the rectangular housing in telescoping relation therein.

7. A magnifying device as defined in claim 5 wherein said base member defines a recess having a substantially rectangular transverse cross-section so as to facilitate sliding telescoping of said frame means on said housing.

8. A magnifying device for use with a hand-held video or alpha-numeric display apparatus which includes a housing, a display supported by the housing so as to be visually observable from externally of the housing, and controls manipulatable from externally of said housing to effect varying functions of the display apparatus, said magnifying device comprising frame means including a base member adapted for releasable mounting on the housing, and a magnifying lens support frame having a plurality of support arms, said base member having a corresponding number of guide tracks adapted to receive said support arms in adjustable sliding relation and having a plurality of openings adapted for selective registration with said manipulatable controls so as to enable manipulation of said controls when the magnifying device is mounted on the display apparatus housing, said support frame supporting a magnifying lens adapted to overlie the display when said magnifying device is mounted on the housing, said magnifying lens being operative to effect magnification of said display when viewed through said lens during operation of the display apparatus.

9. A magnifying device for use with a hand-held video or alpha-numeric display apparatus which includes a housing and a display supported by the housing so as to be visually observable from externally of the housing, said magnifying device comprising frame means including a base member adapted for releasable mounting on the housing, and a magnifying lens support frame adjustable supported by said base member and supporting a magnifying lens adapted to overlie the display when said magnifying device is mounted on the housing, said base member and said lens support frame being generally rectangular in plan configuration, said base member including a guide track adjacent each corner of the rectangular base member, said lens support frame including a support arm adjacent each corner of the rectangular lens support frame for cooperation with a corresponding guide track to enable adjustment of said lens support frame relative to said base member, said magnifying lens being operative to effect magnification of said display when viewed through said lens during operation of the display apparatus.

10. A magnifying device as defined in claim 9 wherein each of said support arms has detent means formed thereon, each of said guide tracks having recess means cooperative with the detent means on the corresponding support arms to releasably retain said lens support frame in a position closely adjacent said base member.

11. A magnifying device as defined in claim 10 wherein each of said support arms is bifurcated at a free end thereof so as to bias said detent means into the corresponding recess means when said lens support frame is in said closely adjacent relation to said base member.

* * * * *